US012559082B2

(12) United States Patent
Arangarasan et al.

(10) Patent No.: US 12,559,082 B2
(45) Date of Patent: Feb. 24, 2026

(54) SPRING BRAKE ACTUATOR AND RETAINING DEVICE FOR SUCH SPRING BRAKE ACTUATOR

(71) Applicant: ZF CV Systems Europe BV, Brussels (BE)

(72) Inventors: Senthil Kumar Arangarasan, Chennai (IN); Pratheesh Kumar Prem Kumar, Coimbatore (IN); Aravindda Swamy Venkatesh, Chennai (IN)

(73) Assignee: ZF CV Systems Europe BV, Brussels (BE)

( * ) Notice: Subject to any disclaimer, the term of this patent is extended or adjusted under 35 U.S.C. 154(b) by 358 days.

(21) Appl. No.: 17/781,456

(22) PCT Filed: Dec. 5, 2019

(86) PCT No.: PCT/EP2019/083868
§ 371 (c)(1),
(2) Date: Jun. 1, 2022

(87) PCT Pub. No.: WO2021/110272
PCT Pub. Date: Jun. 10, 2021

(65) Prior Publication Data
US 2023/0001911 A1       Jan. 5, 2023

(51) Int. Cl.
*B60T 17/08* (2006.01)
*B60T 15/02* (2006.01)
(Continued)

(52) U.S. Cl.
CPC ............ *B60T 17/083* (2013.01); *B60T 15/02* (2013.01); *F16D 2121/10* (2013.01); *F16D 2127/00* (2013.01)

(58) Field of Classification Search
CPC ............. F16D 2121/02; F16D 2121/14; F16D 2125/68; F16D 2127/06; F16D 51/22;
(Continued)

(56) References Cited

U.S. PATENT DOCUMENTS

| | | | | | |
|---|---|---|---|---|---|
| 2,503,854 | A | * | 4/1950 | Trainor | F16B 21/073 |
| | | | | | 285/403 |
| 2,630,343 | A | * | 3/1953 | Jones | F16J 15/3208 |
| | | | | | 277/555 |

(Continued)

FOREIGN PATENT DOCUMENTS

| | | | |
|---|---|---|---|
| EP | 0542568 A2 | * | 5/1993 |
| EP | 0897845 A2 | | 2/1999 |

(Continued)

OTHER PUBLICATIONS

European Patent Office, Rijswijk, Netherlands, International Search Report of International Application No. PCT/EP2019/083868, Mailed Aug. 31, 2020, 3 pages.

*Primary Examiner* — Robert A. Siconolfi
*Assistant Examiner* — Mahbubur Rashid
(74) *Attorney, Agent, or Firm* — Dickinson Wright PLLC

(57) ABSTRACT

A spring brake actuator (2) for use in a commercial vehicle includes a cylinder housing (4) including a spring brake piston (10) for applying a braking force, a spring guide (12) attached to the spring brake piston (10). The spring guide (12) includes a valve (14) and a retaining device (16) for retaining the valve (14). The retaining device (16) includes a basic body (34) and clamping portions (36) for clamping the retaining device (16) to the spring guide (12). The clamping portions (36) are arranged at the basic body (34) along a circumference (38) thereof, and the clamping por-
(Continued)

tions (36) are spaced apart from each other forming slits (40) between the clamping portions (36) to allow for a circulation of air through the slits (40).

19 Claims, 4 Drawing Sheets

(51) Int. Cl.
    *F16D 121/10*          (2012.01)
    *F16D 127/00*          (2012.01)
(58) Field of Classification Search
    CPC .. F16D 2127/10; F16D 59/02; F16D 2121/08;
            F16D 65/562; F16D 2121/10; F16D
            2125/582; F16D 2121/16; F16D 2121/22;
            F16D 2121/26; F16D 2055/0041; F16D
            2065/1348; F16D 2500/50293; F16D
            55/2262; F16D 65/543; F16D 2127/00;
            B60T 17/083; B60T 17/085; B60T 15/02;
            F16K 15/148; F16K 15/1481
    See application file for complete search history.

(56)                    References Cited

U.S. PATENT DOCUMENTS

| | | | | | |
|---|---|---|---|---|---|
| 3,037,522 | A | * | 6/1962 | Millan | F16K 15/148 |
| | | | | | 137/854 |
| 3,331,390 | A | * | 7/1967 | Hoffman | F16K 15/148 |
| | | | | | 137/454.2 |
| 3,954,121 | A | * | 5/1976 | Kardos | F16K 15/148 |
| | | | | | 137/854 |
| 4,820,409 | A | * | 4/1989 | Lowsky | F16K 15/1402 |
| | | | | | 210/DIG. 17 |
| 5,226,291 | A | | 7/1993 | Osterday et al. | |
| 6,148,711 | A | * | 11/2000 | Stojic | B60T 17/086 |
| | | | | | 92/63 |
| 6,588,314 | B1 | * | 7/2003 | Stojic | B60T 17/083 |
| | | | | | 92/63 |
| 6,907,818 | B2 | * | 6/2005 | Anderson | B60T 13/261 |
| | | | | | 92/62 |
| 7,461,907 | B2 | * | 12/2008 | Plantan | B60T 17/083 |
| | | | | | 277/435 |
| 9,150,226 | B2 | * | 10/2015 | Rode | B61F 15/20 |
| 9,409,267 | B2 | * | 8/2016 | Plantan | B23P 19/084 |
| 9,487,203 | B2 | * | 11/2016 | Park | B60T 17/083 |
| 9,701,297 | B2 | * | 7/2017 | Fisher | B60T 17/083 |
| 10,493,972 | B2 | * | 12/2019 | Fisher | B60T 17/083 |
| 10,525,955 | B2 | * | 1/2020 | Inoue | F16K 15/145 |
| 10,663,025 | B2 | * | 5/2020 | Darner | B60T 17/088 |
| 2007/0034465 | A1 | * | 2/2007 | Thompson | F16F 13/002 |
| | | | | | 188/322.16 |
| 2008/0178884 | A1 | * | 7/2008 | Gerson | A62B 9/02 |
| | | | | | 137/854 |
| 2015/0209870 | A1 | * | 7/2015 | Haimer | B23B 31/006 |
| | | | | | 279/133 |

FOREIGN PATENT DOCUMENTS

| | | | | | | |
|---|---|---|---|---|---|---|
| KR | 20160056959 | A | * | 5/2016 | .......... | F16K 15/148 |
| WO | WO-2019042493 | A1 | * | 3/2019 | .......... | B23Q 1/0072 |

* cited by examiner

SPRING BRAKE ACTUATOR AND RETAINING DEVICE FOR SUCH SPRING BRAKE ACTUATOR

FIELD

The present invention relates to a spring brake actuator, in particular a parking or emergency spring brake actuator for use in a commercial vehicle.

BACKGROUND

Spring brake actuators are used in the commercial vehicle industry to provide parking and/or emergency brake capability. Spring brake actuators are regularly connected to a service brake actuator and often act upon the same brake components which transmit the brake force to the vehicle wheel. Utilizing these two brake types together leads to the challenge of ensuring that only one of the brakes is activated at a time. This challenge is present because whenever one of the brakes, such as the parking brake, is activated, adding additional brake force by the second brake, such as the service brake, can potentially cause damage to the brake components. Activating the two brakes together is also called compounding.

To reduce brake forces in case of compounding, over-pressure valves are used in modern brake systems. In spring brake actuators, for example, overpressure check valves are utilized, which are regularly arranged in the spring guide of the spring brake piston.

To retain such valves to the spring guide, a combination of a circlip and a plate is utilized. The circlip and plate help to retain the valve and also to ensure that air may pass through the retaining components and reach the valve.

There are, however, certain drawbacks associated with this solution. First of all, it has been found that the assembly of the two parts is rather difficult and time-consuming as these parts need to be assembled in the correct order, correct orientation, and they need to be centered within an accommodation space of the spring guide. Furthermore, the airflow through the circlip/plate combination has been found to be uneven and a turbulent airflow may be generated, which is generally unwanted.

SUMMARY

Consequently, it is an object of the present disclosure to provide a spring brake actuator having a retaining device that is easier and faster to assemble and that improves the airflow characteristics through the device.

The present disclosure attains this object by providing a retaining device for retaining the valve, the retaining device comprising a basic body and clamping members for clamping the device to a spring guide. In particular, the present disclosure attains this object in one embodiment where the clamping members are arranged at the basic body and along a circumference of the basic body and wherein the clamping members are spaced apart from each other forming slits between the clamping members to allow for a circulation of air through the slits.

In one aspect, the actuator includes a cylinder housing comprising a cylinder housing base, a spring brake piston located in said cylinder housing for applying a braking force, a spring guide being attached to the spring brake piston and a compression spring located between the cylinder housing base and the spring guide of the spring brake piston, said compression spring being effective to push the spring brake piston away from the base, wherein the spring guide includes a valve and a retaining device for retaining the valve, the retaining device including a basic body and clamping members for clamping the device to a spring guide.

The present disclosure is based on the finding that by combining the basic body and the clamping members into one component, the likelihood of erroneous assemblies can be reduced significantly. Furthermore, the design, according to an aspect of the disclosure, allows for a self-centering capability of the retaining device in the accommodation space of the spring guide. Additionally, the slits allow for an increased and even airflow through the retaining device towards the valve. Based on the number, geometry, and width of the slits between the clamping members, the airflow characteristics may be influenced individually depending on the valve type and the assembly conditions.

In a preferred embodiment, the basic body has a shape of a disc. With the help of this disc shape, the retaining surface of the retaining device is increased while the basic body at the same time provides enough stability to securely retain the valve.

According to yet another embodiment, the retaining device includes a circular groove arranged circumferentially around a longitudinal axis of the basic body. This groove has been found to be beneficial to facilitate the clamping functionality of the clamping members as the groove provides room into which the clamping members may be bent when the retaining device is assembled into the accommodation space of the spring guide.

In a preferred embodiment, the circular groove is V-shaped. This shape has been found to be beneficial to maintain the stability of the retaining device while at the same time providing enough room for the clamping members to bend to the inside when the retaining device is assembled.

Preferably, the retaining device has a first side and a second side, the second side being arranged axially opposite of the first side, wherein the circular groove is arranged at the first side, only. This ensures that at the second side, which is preferably used to retain the valve, the retaining surface is maximized. On the other hand, on the first side, which is preferably the air inlet side of the retaining device, enough room is provided for the clamping members to bend inwardly when assembled without closing the slits between the clamping members.

In a preferred embodiment, the clamping members extend diagonally outwards from the basic body in an angle of 1°-60° relative to the longitudinal axis, preferably 25°-40°. By designing the clamping members in a way that they extend diagonally outwards from the basic body, the retaining device may be clamped securely into an accommodation space. This diagonal extension helps to ensure that the valve is kept in place during operation. Furthermore, the retaining device may be easily assembled and dissembled while the clamping members help to center the retaining device in the accommodation space.

In yet another preferred embodiment, the clamping members are integrally formed with the basic body. In other words, it is preferred that the clamping members and the basic body are manufactured as one piece. This not only reduces manufacturing costs but also ensures a lower part-complexity.

Furthermore, it is preferred that the basic body includes 5-20 clamping members, preferably 8 clamping members. This number of clamping members has been found to be beneficial to ensure that the retaining device may be securely fixed in an accommodation space, center itself, and provide a reasonable airflow through the device while the complexity of the device is kept low.

In a preferred embodiment, the slits between the spaced apart clamping members have a width of 0.3-2 mm, preferably 0.7 mm. This dimensioning of the slits has been found to facilitate a sufficient and mostly unturbulent airflow through the valve. Furthermore, the slits support the bending capabilities of the clamping members, facilitating the assembly of the retaining device in the accommodation space.

In yet another preferred embodiment the basic body has a thickness $t_b$ of 0.5 mm-2 mm, preferably 1 mm. This thickness keeps the dimensions of the retaining device low and ensures that the retaining device may be utilized in accommodation spaces in which the room available for the accommodation of the retaining device is limited.

Furthermore, it is preferred that the clamping members include a circular shoulder for positioning the retaining device in a spring guide. Such a circular shoulder ensures that the retaining device may be properly secured to an accommodation space that also preferably has a corresponding shoulder. This correspondence helps to ensure that the valve is safely retained with respect to the spring guide.

In yet another preferred embodiment, the retaining device is partially or completely made of plastic material, sheet metal, or a combination of the above. Preferably, the plastic material is a crystalline or semi crystalline plastic material, particularly preferred polypropylene terephtalate (PPT), polyamide (PA), polyoxymethylene (POM), polyphthalamide (PPA), or polypropylene (PP). It is furthermore preferred that the sheet metal is steel, a steel alloy, aluminum, or an aluminum alloy. This selection of materials has been found to be beneficial for the proposed application of the retaining device.

According to a preferred embodiment, the retaining device is fitted to the spring guide by at least one of the following: press fit, snap fit, threaded fastening, adhesive bonding, shrink fitting, and wobbles riveting. These different ways of fitting the retaining device to the spring guide have been found to be beneficial for various applications of the retaining device at vehicle brakes.

According to a further aspect, the present disclosure also relates to a retaining device for retaining a valve, the retaining device comprising a basic body and clamping members for clamping the device to a spring guide.

According to this further aspect, the clamping members are arranged at the basic body and along a circumference of the basic body, wherein the clamping means are spaced apart from each other forming slits between the clamping members to allow for a circulation of air through the slits. The retaining device takes advantage of the same benefits and preferred embodiments as the spring brake actuator comprising such a retaining device according to the present disclosure. In this regard, reference is made to the above explanations and their content is included herein.

For a more complete understanding of the present disclosure, the present disclosure will now be described in detail with reference to the accompanying drawings.

BRIEF DESCRIPTION OF THE DRAWINGS

This present disclosure will now be described with reference to the accompanying drawings which illustrate, by way of example and not by way of limitation, one of several possible embodiments of the brake actuator proposed herein, and wherein:

4

Figure 1:
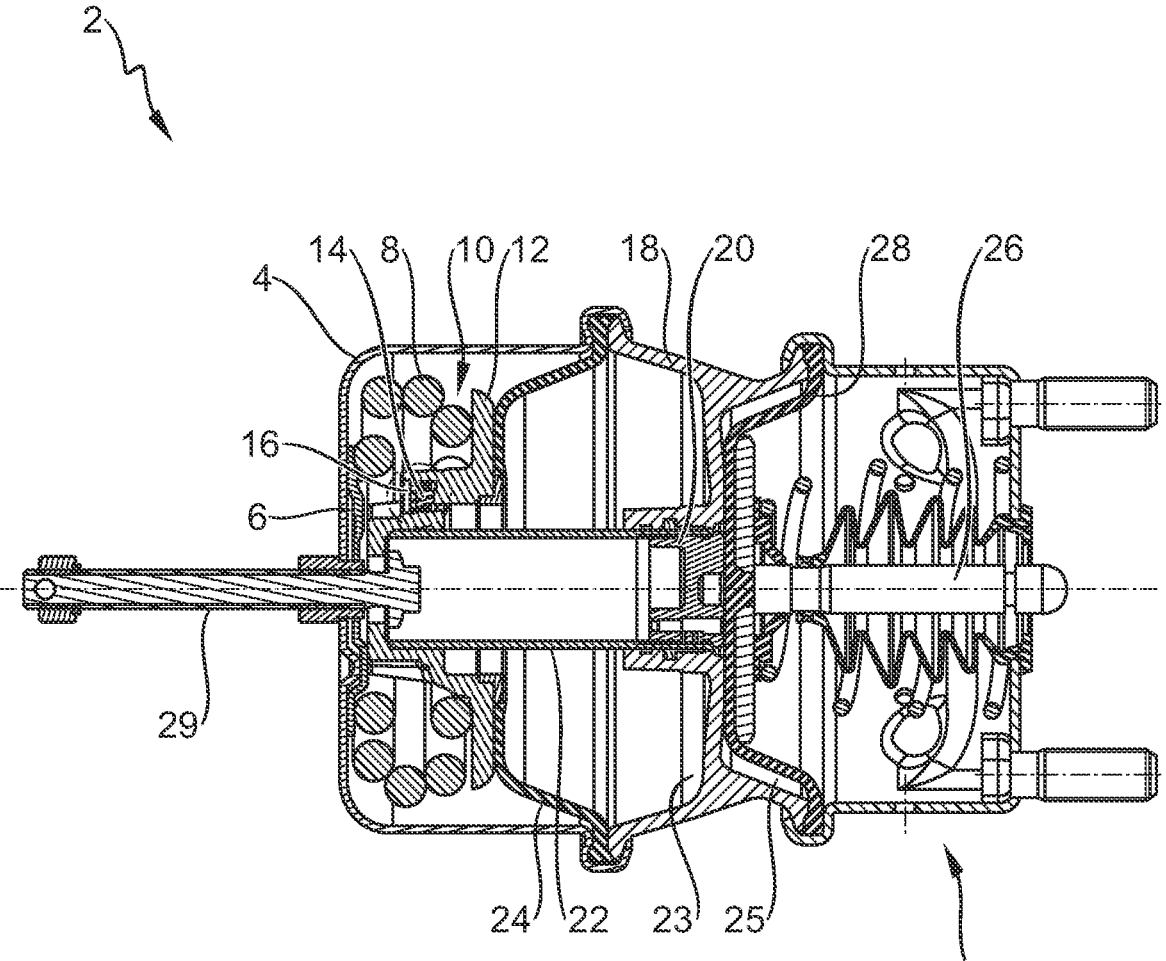
Figure 2:
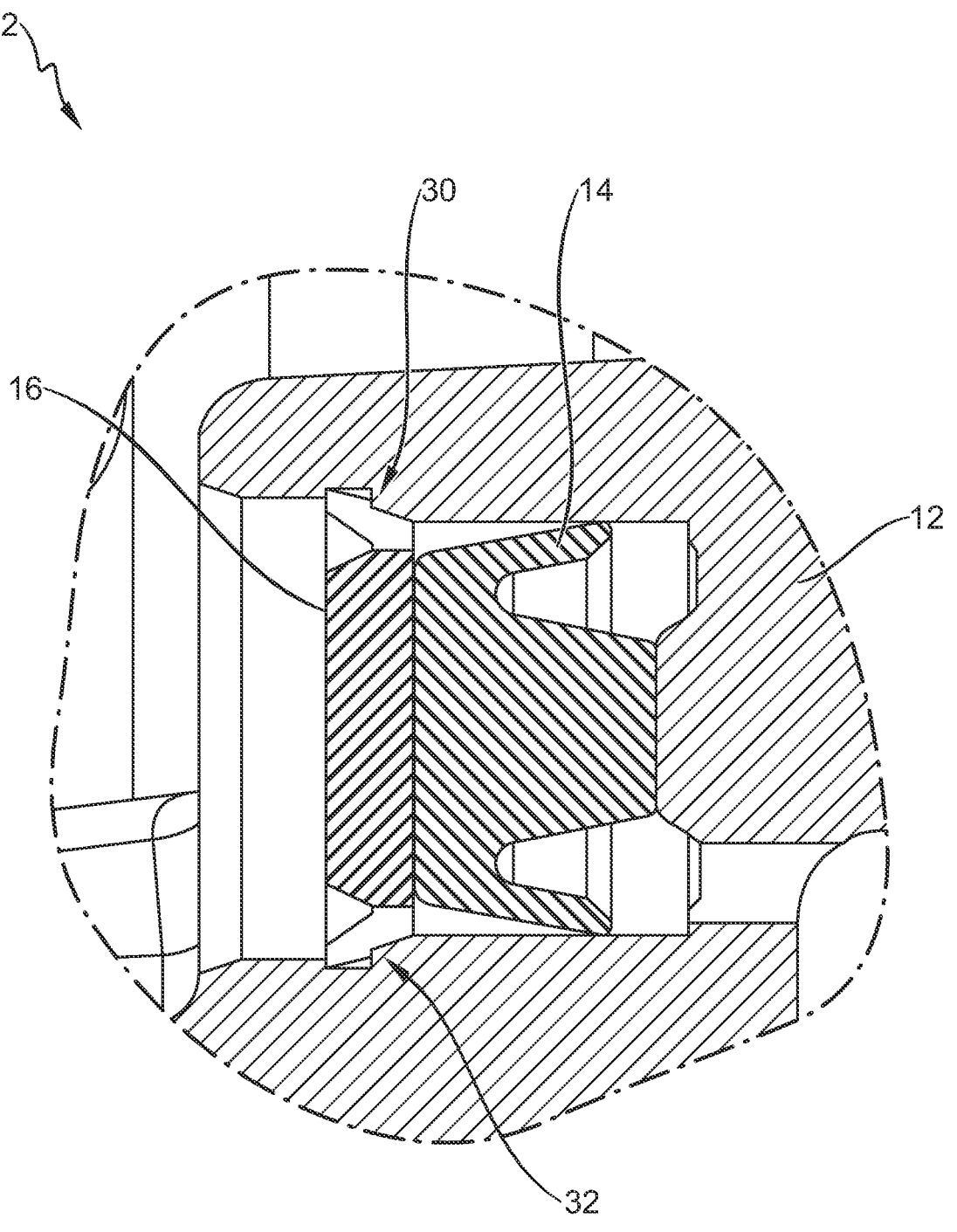
Figure 3:
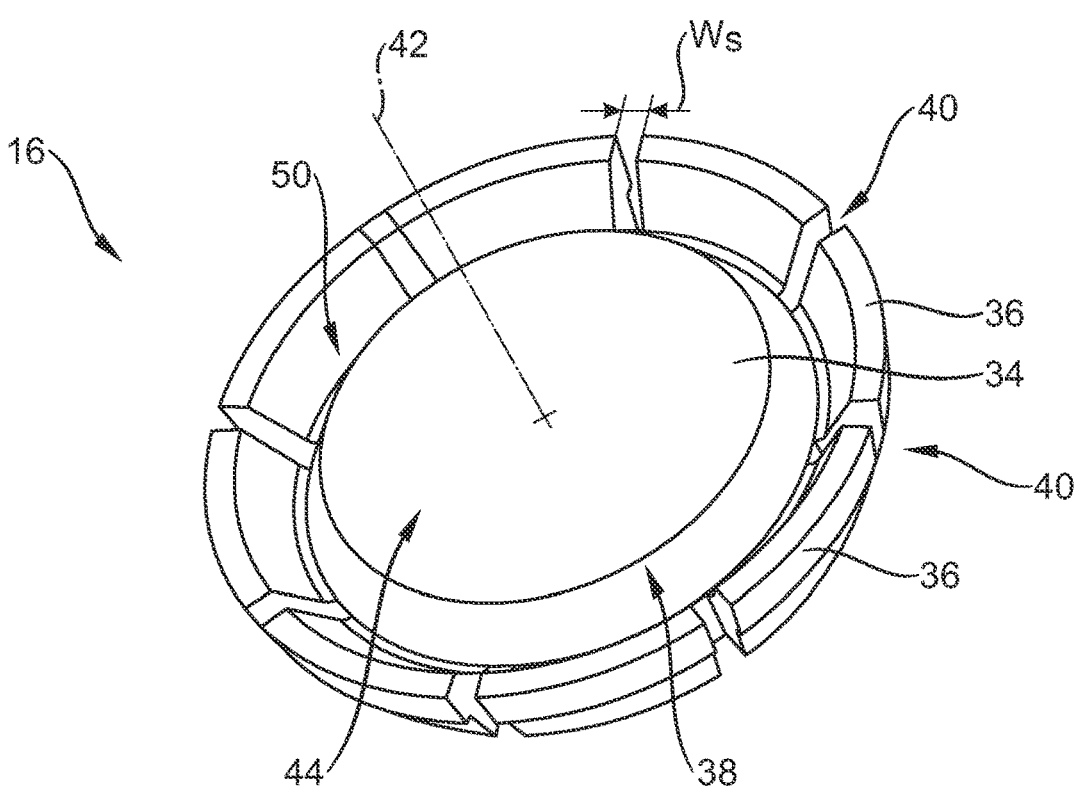
Figure 4:
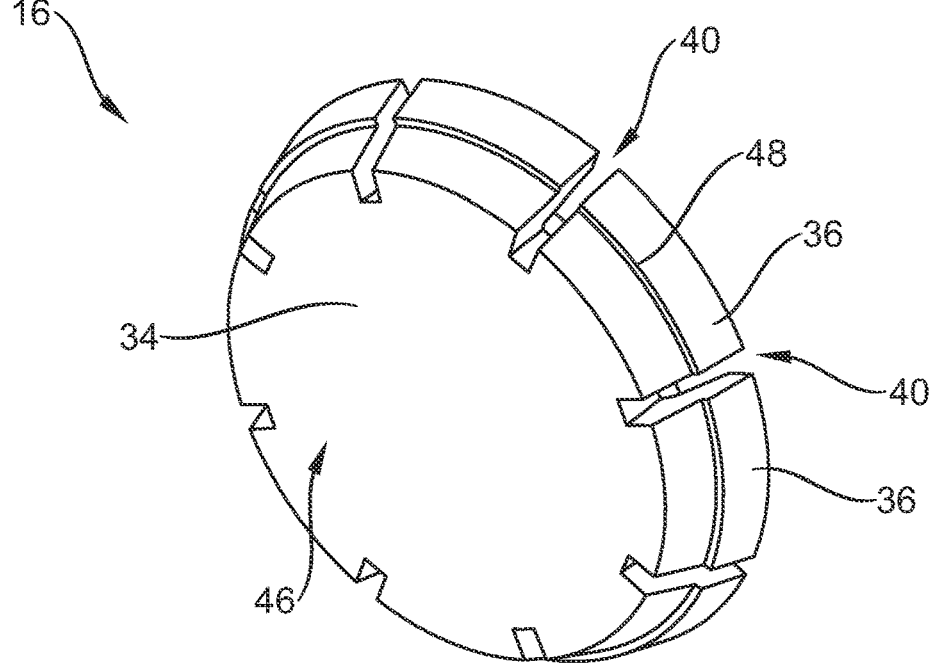
Figure 5:
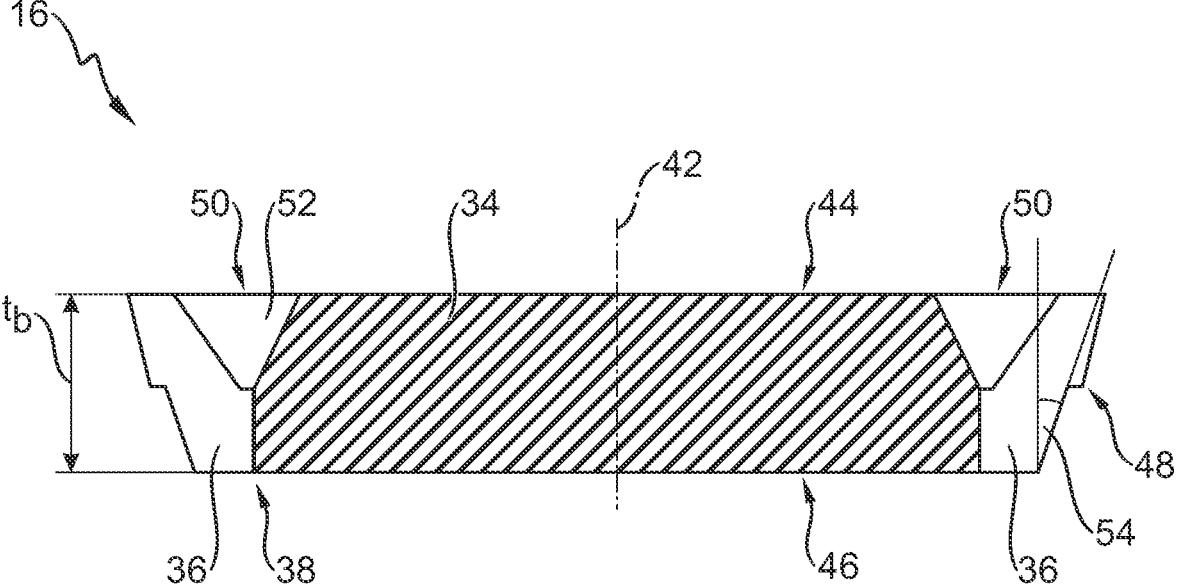

FIG. 1 is a sectional view of a spring brake actuator according to an aspect of the disclosure;

FIG. 2 is an enlarged sectional view of the spring brake actuator according to FIG. 1 showing a retaining device according to an aspect of the disclosure;

FIG. 3 is a perspective view of one side of the retaining device according to an aspect of the disclosure;

FIG. 4 is a perspective view of another side of the retaining according to an aspect of the disclosure; and FIG. 5 is a sectional view of the retaining device according to an aspect of the disclosure.

DETAILED DESCRIPTION

FIG. 1 shows a cross-sectional schematic view of a spring brake actuator 2. The spring brake actuator 2 includes a cylinder housing 4. Inside the cylinder housing 4, a compression spring 8 and a pressure chamber 23 are arranged. The compression spring 8 rests on the left side of FIG. 1 against a cylinder housing base 6 and on the opposite side on a spring guide 12 of a spring brake piston 10. The spring brake piston 10 is shown being held in a brake release position by a positive pressure inside the pressure chamber 23.

The spring brake piston 10 is adapted to act upon a diaphragm 24 of the spring brake actuator 2, which transmits the inflicted force to a rod 26 which, in turn, transmits the applied power to the wheel brakes (not shown).

The spring brake actuator 2 furthermore includes a release bolt 29. The release bolt 29 is utilized to release the spring brake actuator 2 in case of malfunctions, for example. The spring brake actuator 2 moreover includes a flange 18 which is utilized to connect a service brake 27 to the spring brake actuator 2. The service brake 27 includes a service brake pressure chamber 25 into which a pressure may be built up to generate a force upon the service diaphragm 28 which transmits the inflicted force to the rod 26.

In the event that both the spring brake actuator 2 and the service brake 27 are operated simultaneously, pressure is released from the service brake pressure chamber 25 through an internal breathing valve 20 and via a tubular stem 22 through a retaining device 16 and a check valve 14 into the pressure chamber 23. With the help of this arrangement, whenever the spring brake actuator 2 and the service brake 27 are operated simultaneously (which is also called compounding), the braking forces of the two brakes do not add up and damage the rod 26 or parts of the wheel brakes.

FIG. 2 shows a detailed view of a portion of the spring brake actuator 2 having the retaining device 16. As can be seen from FIG. 2, the retaining device 16 retains the check valve 14 and attaches it to the spring guide 12. The retaining device 16 holds the check valve 14 in place and also allows for a passage of air through the retaining device 16. The retaining device 16 is attached in a receiving space 30 and held in position with the help of a receiving space shoulder 32.

FIG. 3 shows a detailed perspective of the retaining device 16. The retaining device 16 comprises a basic body 34 and clamping portions 36. The clamping portions 36 are arranged along a circumference 38 of the basic body 34. The clamping portions 36 are spaced apart from each other forming slits 40 in between the clamping portions 36 to allow for a circulation of air through the slits 40. The slits have a width $w_s$. In FIG. 3, a first side 44 of the basic body 34 is shown. Furthermore, a longitudinal axis 42 of the retaining device 16 is illustrated. The basic body 34 illustrated in FIG. 3 includes eight clamping portions 36. Also, the retaining device 16 includes a circular groove 50 arranged circumferentially around the longitudinal axis 42. The groove 50 facilitates the capability of the clamping portions 36 to be bendable inwardly towards the longitudinal axis 42 to allow for an easy assembly of the retaining device 16.

FIG. 4 shows the retaining device 16 from another side showing a second side 46 of the basic body 34. It can be seen from FIG. 4 that the clamping portions 36 include a circular shoulder 48. This circular shoulder 48 may be brought into alignment with the receiving space shoulder 32 (see FIG. 2) to center and accommodate the retaining device 16 in the desired position.

FIG. 5 shows a cross-sectional view of the retaining device 16 including the basic body 34 and clamping portions 36. The retaining device 16 includes the circular groove 50 arranged circumferentially around the longitudinal axis 42 of the basic body 34. The circular groove 50 is V-shaped 52. Furthermore, the circular groove 50 is arranged at the first side 44 of the basic body 34, only. The basic body 34 has a thickness $t_b$ while the clamping portions 36 extend diagonally outwards from the basic body 34 at an angle 54.

The above detailed description illustrates and describes what is considered as a preferred embodiment of the invention. It should of course be understood that various modifications and changes in form or detail could readily be made without departing from the spirit of the present disclosure. It is therefore intended that the present disclosure may not be limited to the exact form and detail shown and described herein, nor to anything less than the whole of the present disclosure disclosed herein and as claimed hereinafter. Further, the features described in the description, the drawings, and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

LIST OF REFERENCES (PART OF SPECIFICATION)

2 spring brake actuator
4 cylinder housing
6 cylinder housing base
8 compression spring
10 spring brake piston
12 spring guide
14 check valve
16 retaining device
18 flange
20 internal breathing valve
22 tubular stem
23 pressure chamber
24 diaphragm
25 service brake pressure chamber
26 rod
27 service brake
28 service diaphragm
29 release bolt
30 receiving space
32 receiving space shoulder
34 basic body
36 clamping portions
38 circumference of the basic body
40 slits
42 longitudinal axis

44 first side of basic body
46 second side of basic body
48 circular shoulder
50 circular groove
52 V-shape
54 clamping portions extending angle
$w_s$ width of slits
$t_b$ thickness of basic body

The invention claimed is:

1. A spring brake actuator (2), in particular a parking or emergency spring brake actuator (2) for use in a commercial vehicle, said actuator (2) comprising:

a cylinder housing (4) including a cylinder housing base (6), a spring brake piston (10) located in said cylinder housing (4) for applying a braking force, a spring guide (12) attached to the spring brake piston (10), a compression spring (8) located between the cylinder housing base (6) and the spring guide (12) of the spring brake piston (10), said compression spring (8) operable to push the spring brake piston (10) away from the base (6), wherein the spring guide (12) includes a valve (14) and a retaining device (16) for retaining the valve (14), the retaining device (16) including a basic body (34) and clamping portions (36) for clamping the retaining device (16) to the spring guide (12), wherein the clamping portions (36) are arranged at the basic body (34) and along a circumference (38) of the basic body (34), wherein the clamping portions (36) are spaced apart from each other forming slits (40) between the clamping portions (36) to allow for a circulation of air through the slits (40);

wherein the valve (14) is fixed in place axially between the retaining device (16) and the spring guide (12);

wherein the basic body (34) has a disc shape.

2. The spring brake actuator (2) according to claim 1, wherein the retaining device (16) includes a circular groove (50) arranged circumferentially around a longitudinal axis (42) of the basic body (34).

3. The spring brake actuator (2) according to claim 2, wherein the circular groove (50) is V-shaped (52).

4. The spring brake actuator (2) according to claim 2, wherein the retaining device (16) has a first side (44) and a second side (46), the second side (46) arranged axially opposite the first side (44), wherein the circular groove (50) is arranged only at the first side (44).

5. The retaining device (16) according to claim 2, wherein the clamping portions (36) define a circular shoulder (48) for positioning the retaining device (16) against a corresponding circular shoulder defined in the spring guide (12).

6. The spring brake actuator (2) according to claim 1, wherein the clamping portions (36) extend diagonally outwards from the basic body (34) at an angle (54) of 1°-60° relative to the longitudinal axis (42).

7. The spring brake actuator (2) according to claim 1, wherein the clamping portions (36) are integrally formed with the basic body (34).

8. The spring brake actuator (2) according to claim 1, wherein the basic body (34) comprises 5-20 clamping portions (36).

9. The spring brake actuator (2) according to claim 1, wherein the slits (40) between the spaced apart clamping portions (36) have a width ($W_s$) of 0.3-2 mm.

10. The spring brake actuator (2) according to claim 1, wherein at the basic body has a thickness ($t_b$) of 0.5 mm-2 mm.

11. The spring brake actuator (2) according to claim 1, wherein the clamping portions (36) define a circular shoulder (48) for positioning the retaining device (16) in the spring guide (12).

12. The spring brake actuator (2) according to claim 11, wherein the spring guide (12) defines a receiving space (30) having a receiving space shoulder (32) abutting the circular shoulder (48) of the retaining device (16) disposed within the receiving space (30).

13. The spring brake actuator (2) according to claim 1, wherein the retaining device (16) is partially or completely made of sheet metal and/or plastic, wherein the sheet metal is steel or aluminum sheet metal, wherein the plastic is one or more of crystalline or semi crystalline plastic, polypropylene terephtalate (PPT), polyamide (PA), polyoxymethylene (POM), polyphthalamide (PPA), or polypropylene (PP).

14. A spring brake actuator (2), in particular a parking or emergency spring brake actuator (2) for use in a commercial vehicle, said actuator (2) comprising:

a cylinder housing (4) including a cylinder housing base (6), a spring brake piston (10) located in said cylinder housing (4) for applying a braking force, a spring guide (12) attached to the spring brake piston (10), a compression spring (8) located between the cylinder housing base (6) and the spring guide (12) of the spring brake piston (10), said compression spring (8) operable to push the spring brake piston (10) away from the base (6), wherein the spring guide (12) includes a valve (14) and a retaining device (16) for retaining the valve (14), the retaining device (16) including a basic body (34) and clamping portions (36) for clamping the retaining device (16) to the spring guide (12), wherein the clamping portions (36) are arranged at the basic body (34) and along a circumference (38) of the basic body (34), wherein the clamping portions (36) are spaced apart from each other forming slits (40) between the clamping portions (36) to allow for a circulation of air through the slits (40);

wherein the basic body (34) of the retaining device (16) has a disc shape and extends across a base of the valve (14), wherein the basic body (34) abuts the base of the valve (14);

wherein the clamping portions (36) extend radially outward from the basic body (34) and are flexible relative to the basic body (36) for permitting insertion of the retaining device (16) into the spring guide (12);

wherein the retaining device (16) is fixed in place relative to the spring guide (12);

wherein the valve (14) is fixed in place axially between the retaining device (16) and the spring guide (12) and does not shift axially relative to the spring guide (12).

15. The spring brake actuator (2) according to claim 14, wherein the retaining device (16) includes a circular groove (50) arranged circumferentially around a longitudinal axis (42) of the basic body (34).

16. The spring brake actuator (2) according to claim 15, wherein the circular groove (50) is V-shaped (52).

17. The spring brake actuator (2) according to claim 15, wherein the retaining device (16) has a first side (44) and a second side (46), the second side (46) arranged axially opposite the first side (44), wherein the circular groove (50) is arranged only at the first side (44).

18. The spring brake actuator (2) according to claim 14, wherein the clamping portions (36) extend diagonally outwards from the basic body (34) at an angle (54) of 1°-60° relative to the longitudinal axis (42).

19. The spring brake actuator (2) according to claim 14, wherein the clamping portions (36) are integrally formed with the basic body (34).

* * * * *